United States Patent
Naito

(10) Patent No.: US 9,675,932 B2
(45) Date of Patent: Jun. 13, 2017

(54) IMPURITIES REMOVAL SYSTEM

(71) Applicant: IHI Corporation, Tokyo (JP)

(72) Inventor: Toshiyuki Naito, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 14/939,174

(22) Filed: Nov. 12, 2015

(65) Prior Publication Data

US 2016/0059186 A1 Mar. 3, 2016

Related U.S. Application Data

(63) Continuation of application No. PCT/JP2014/063625, filed on May 22, 2014.

(30) Foreign Application Priority Data

Jun. 10, 2013 (JP) .................. 2013-121486

(51) Int. Cl.
 *B01D 53/78* (2006.01)
 *B01D 53/00* (2006.01)
 *B01D 53/50* (2006.01)

(52) U.S. Cl.
 CPC ........... *B01D 53/78* (2013.01); *B01D 53/002* (2013.01); *B01D 53/504* (2013.01);
 (Continued)

(58) Field of Classification Search
 CPC .......... B01D 2251/30; B01D 2251/304; B01D 2251/40; B01D 2251/402;
 (Continued)

(56) References Cited

U.S. PATENT DOCUMENTS

| | | |
|---|---|---|
| 2010/0206165 A1 | 8/2010 | Alban et al. |
| 2012/0014861 A1 | 1/2012 | Hirata et al. |

(Continued)

FOREIGN PATENT DOCUMENTS

| | | |
|---|---|---|
| JP | 2005-319358 | 11/2005 |
| JP | 2007-260560 | 10/2007 |

(Continued)

OTHER PUBLICATIONS

U.S. Appl. No. 14/963,925, filed Dec. 9, 2015, Naito.

(Continued)

*Primary Examiner* — Amber R Orlando
*Assistant Examiner* — Cabrena Holecek
(74) *Attorney, Agent, or Firm* — Oblon, McClelland, Maier & Neustadt, L.L.P.

(57) ABSTRACT

Provided are drain tank storing predetermined amount of drain from cooler; alkaline aqueous solution supply unit with aqueous solution adjustment tank receiving and storing part of drain in drain tank in predetermined amount, solid alkaline agent supplier supplying solid alkaline agent to produce alkaline aqueous solution, alkaline concentration controller controlling solid alkaline agent supplier to regulate alkaline concentration of alkaline aqueous solution, and pump supplying alkaline aqueous solution to exhaust gas entry side of cooler; and alkaline supply control unit with impurity sensor downstream of succeeding cooler, drain pH sensor obtaining detected pH of drain in drain tank, and supply controller controlling alkaline supply amount supplied to exhaust gas entry side of cooler based on detected impurity value to make detected pH to set value.

16 Claims, 3 Drawing Sheets

(52) U.S. Cl.
CPC .... *B01D 2251/30* (2013.01); *B01D 2251/304* (2013.01); *B01D 2251/40* (2013.01); *B01D 2251/402* (2013.01); *B01D 2251/404* (2013.01); *B01D 2251/602* (2013.01); *B01D 2251/604* (2013.01); *B01D 2251/606* (2013.01); *B01D 2256/22* (2013.01); *B01D 2257/80* (2013.01); *B01D 2258/0283* (2013.01); *B01D 2259/124* (2013.01)

(58) Field of Classification Search
CPC ........ B01D 2251/404; B01D 2251/602; B01D 2251/604; B01D 2251/606; B01D 2256/22; B01D 2257/80; B01D 2258/0283; B01D 2259/124; B01D 53/002; B01D 53/504; B01D 53/78
See application file for complete search history.

(56) References Cited

U.S. PATENT DOCUMENTS

| | | | |
|---|---|---|---|
| 2013/0315809 A1 | 11/2013 | Shimamura | |
| 2013/0319040 A1 | 12/2013 | Naito | |
| 2015/0375167 A1* | 12/2015 | Naito | B01D 53/504 423/243.05 |
| 2016/0018159 A1* | 1/2016 | Naito | B01D 53/002 62/617 |
| 2016/0067651 A1* | 3/2016 | Naito | B01D 53/002 422/111 |
| 2016/0096139 A1* | 4/2016 | Naito | B01D 53/002 422/112 |

FOREIGN PATENT DOCUMENTS

| | | | | |
|---|---|---|---|---|
| JP | 2010-172878 | 8/2010 | | |
| JP | 2010-241630 | 10/2010 | | |
| JP | 2010-533063 | 10/2010 | | |
| JP | 2012-106163 | 6/2012 | | |
| JP | WO 2012107953 A1 * | 8/2012 | ........... | B01D 53/002 |
| JP | 2012-166139 | 9/2012 | | |
| JP | WO 2014064894 A1 * | 5/2014 | ............ | C01B 31/20 |
| WO | WO 2012/107953 | 8/2012 | | |
| WO | WO 2014/064894 | 5/2014 | | |

OTHER PUBLICATIONS

U.S. Appl. No. 14/844,135, filed Sep. 3, 2015, Naito.
U.S. Appl. No. 14/844,694, filed Sep. 3, 2015, Naito.
U.S. Appl. No. 14/941,774, filed Nov. 16, 2015, Naito.
International Search Report issued Sep. 2, 2014 in PCT/JP2014/063625 filed May 22, 2014.

* cited by examiner

IMPURITIES REMOVAL SYSTEM

TECHNICAL FIELD

The present disclosure relates to an impurity removal system adapted to produce and supply an alkaline aqueous solution with no supply of water from outside when an exhaust-gas entry side of a cooler arranged downstream of a compressor for compression of exhaust gas from an oxyfuel combustor is supplied with the alkaline aqueous solution to discharge impurities in the exhaust gas together with drain.

BACKGROUND ART

Recently, an oxyfuel combustor has been reviewed as one of techniques for reducing emission of carbon dioxide ($CO_2$) which is said to be one of factors for global warming, and attention has been attracted to, for example, a coal-fired boiler for oxyfuel combustion of pulverized coal. It has been conceived in the coal-fired boiler that oxygen in lieu of air is used as an oxidizing agent to produce combustion exhaust gas mainly composed of carbon dioxide. The exhaust gas mainly composed of carbon dioxide is compressed and cooled into liquefied or compressed carbon dioxide which is transported to and disposed at a destination. As an example of the disposal, it has been conceived that the liquefied carbon dioxide is stored in the ground. An exhaust gas treatment device for such coal-fired boiler for oxyfuel combustion is disclosed, for example, in Patent Literature 1.

As shown in Patent Literature 1, the oxyfuel combustion of coal by the coal-fired boiler brings about exhaust gas containing, in addition to carbon dioxide ($CO_2$) as main substance, impurities derived from coal supply stock such as nitrogen oxides ($NO_x$), sulfur oxides ($SO_x$), hydrogen chloride (HCl), mercury (Hg) and dust.

For removal of sulfur (S) derived from the coal supply stock and admixed in the exhaust gas from, for example, a coal-fired boiler for oxyfuel combustion, Patent Literature 1 provides a spray-column-type, packed-column-type or other so-called wet desulfurizer used in a conventional air-fired boiler or the like to remove sulfur oxides ($SO_x$). Moreover, for removal of nitrogen (N) derived from the coal supply stock and admixed in the exhaust gas from, for example, the coal-fired boiler for oxyfuel combustion, a catalyst-type or other denitrator is provided to remove nitrogen oxides ($NO_x$). Carbon dioxide thus free from the impurities is guided to and compressed by a compressor.

Among the above-mentioned impurities, sulfur oxides ($SO_x$) may be contacted with and dissolved in water into sulfuric acid and hydrogen chloride (HCl) may be dissolved in water into hydrochloric acid, so that such water-soluble sulfur oxides and hydrogen chloride can be removed through contact with water.

Among the nitrogen oxides ($NO_x$) as the above-mentioned impurities, nitrogen dioxide ($NO_2$) may be contacted with and dissolved in water into nitric acid to become removed. However, the exhaust gas from the coal-fired boiler has less oxygen ($O_2$) so that nitrogen (N) exists substantially in the form of nitrogen monoxide (NO) which is water-insoluble and thus is unremovable by water spraying or the like.

The above-mentioned sulfuric acid, hydrochloric acid and nitric acid are known to corrode parts in the exhaust gas treatment device; mercury, which is trace metal, is known to hurt low-temperature aluminum members constituting a heat exchanger. Thus, preferably, these impurities are to be removed at early stages. There is also a problem that admixture of the impurities into the exhaust gas lowers a purity degree of the carbon dioxide, which makes troublesome the liquefaction of the carbon dioxide through compression and cooling and thus requires larger-sized equipment therefor. Further, it is feared that any sulfur oxides admixed in carbon dioxide liquefied and stored in the ground may react with calcium in the ground to harm sealability of the storage. Thus, in a coal-fired boiler for oxyfuel combustion or other system where produced is exhaust gas mainly composed of carbon dioxide which is to be disposed, it is extremely important to remove impurities in the exhaust gas.

It has been known in the wet desulfurizer as mentioned in the above that water-soluble sulfur oxides and hydrogen chloride as well as dust are removed and nitrogen oxides are partly removed and that mercury, which is inherently low in content, is slightly removed. Moreover, it has been conceived that if mercury in the exhaust gas is still high in concentration even after the above-mentioned exhaust gas treatment is conducted, a mercury-removing column is arranged to remove the mercury by adsorbent or the like.

However, in Patent Literature 1, the impurities in the exhaust gas are removed by both the spray-column-type, packed-column-type or other wet desulfurizer and the catalyst-type or other denitrator arranged in the circulation line. Thus, the desulfurizer and the denitrator for removal of the impurities in the exhaust gas becomes extreme large in size, complicated in structure and increased in installation cost.

Patent Literature 2 discloses a method for purifying gas including $CO_2$, using an absorptive purification unit. Patent Literature 2 with (a) a pretreatment process for removal of impurities in the gas from an oxyfuel combustor, (b) a process for compression of the gas from the process (a) into a pressure between 10 and 50 bar and (c) a process for recovery of the purified $CO_2$-enriched gas in a liquid, gaseous or supercritical state, has an adsorbent bed (adsorptive purification unit) with adsorption character capable of removing water at least partly in the presence of at least either of $NO_x$ or $SO_x$ at between the processes (a) and (b) or downstream of the process (b).

However, Patent Literature 2 also becomes complex in structure and increased in installation cost since the adsorptive purification unit is provided to remove impurities in exhaust gas from oxyfuel combustion. Moreover, the adsorptive purification unit is troublesome in maintenance.

In order to overcome the above-mentioned problems, an impurity removal system has been proposed which comprises a compressor for compression of exhaust gas composed of carbon dioxide from an oxyfuel combustor into a target pressure for disposal thereof. Impurities in the exhaust gas is removed by drain produced by cooling of the exhaust gas compressed by the compressor through a cooler. Further, an alkaline aqueous solution is supplied to an exhaust gas entry side of the cooler arranged downstream of the compressor, thereby enhancing impurity removal effect. According the impurities removal system, impurities can be removed, utilizing the compressor and the cooler provided for liquefied or compressed transportation of the carbon dioxide, thereby attaining substantial simplification of the device.

In the impurities removal system, the compression of the exhaust gas by the compressor facilitates oxidization of the impurities in the exhaust gas; the oxidized impurities tend to be dissolved in the drain produced by cooling through the cooler downstream, whereby the impurities are removed together with the drain. In this case, spray of the alkaline aqueous solution to the exhaust gas entry side of the cooler makes it easy to absorb the oxidized impurities in the exhaust gas by the alkaline aqueous solution having a high pH value, thereby enhancing the impurity removal effect.

General state of art pertinent to the impurities removal system is disclosed, for example, in Patent Literatures 3, 4, 5 and 6.

Patent Literature 3 discloses an exhaust gas treatment system for an oxyfuel combustor with a front impurity removal device and at least one rear impurity removal device. The front impurity removal device comprises a compressor for compression of exhaust gas from the oxyfuel combustor to make water-soluble the impurities in the exhaust gas and a cooler for cooling of the exhaust gas compressed by the compressor to condense water therein to discharge drain with the impurities dissolved. The or each rear impurity removal device comprises a rear compressor for compression of the exhaust gas at a pressure higher than that in the compressor and a rear cooler and serves to discharge drain.

Patent Literature 4 discloses an exhaust gas washing treatment system comprising a quenching/reaction section for cooling of exhaust gas from garbage disposal equipment while neutralizing the same using an aqueous solution containing an alkaline component, and a humidity reducing section for further cooling of the exhaust gas neutralized by the quenching/reaction section. The quenching/reaction section is provided with a cooling-gas introducing device for cooling of the exhaust gas.

Patent Literature 5 discloses an exhaust gas treatment column in which, in a first stage of a column body, exhaust gas is gas-liquid contacted with treating water to remove harmful components in the exhaust gas and, in a second stage, the exhaust gas is cooled and washed to discharge the treated exhaust gas through an exhaust gas outlet on a upper portion of the body. In the exhaust gas treatment column, part and remaining part of the exhaust-gas treating water in the second stage are led to waste-water and circulation tanks, respectively. The treating water stored in the circulation tank is led through a treating-water circulation piping to the first stage and is utilized for the exhaust gas treatment while alkaline liquid is fed to the circulation tank to adjust pH of the treating water in the circulation tank.

Patent Literature 6 discloses a $CO_2$ chemical absorption system comprising a $CO_2$ chemical absorption apparatus and an absorbing-liquid reclaimer. In the $CO_2$ chemical absorption apparatus, $CO_2$ in exhaust gas is contacted with amine-based absorbing liquid in an absorption column, the absorbing liquid having absorbed $CO_2$ being heated in a reclamation column to release $CO_2$, the exhaust gas made free from $CO_2$ being cooled to separate condensed water therefrom, the condensed water being circulated to the reclamation column. In the absorbing-liquid reclaimer, the amine-based absorbing liquid is withdrawn from the reclamation column, a heat-stable salt accumulated in the absorbing liquid being removed by distillation, resultant vapor of the amine-absorbing liquid being fed to the reclamation column. In the $CO_2$ chemical absorption system, part of the condensed water obtained by cooling the exhaust gas made free from $CO_2$ in the reclamation column is used as a solvent for an inorganic alkaline solution to be added into the absorption liquid reclaimer so as to remove through distillation the heat-stable salt accumulated in the amine-based absorbing liquid.

CITATION LIST

Patent Literature

[Patent Literature 1] JP 2010-172878A
[Patent Literature 2] JP 2010-533063A
[Patent Literature 3] WO 2012/107953A
[Patent Literature 4] JP 2005-319358A
[Patent Literature 5] JP 2007-260560A
[Patent Literature 6] JP 2012-166139A

SUMMARY

Technical Problems

To enhance impurity removal effect through spraying of an alkaline aqueous solution to the exhaust gas entry side of the cooler as mentioned in the above requires the alkaline aqueous solution in large quantity. The alkaline aqueous solution is purchased in the state of the alkaline aqueous solution as it is or is prepared by dissolving a solid alkaline agent into water. The purchase of the alkaline aqueous solution has a problem of cost increase whereas the production of the alkaline aqueous solution on site, which requires continuous supply of water, needs a great amount of water for producing the alkaline aqueous solution.

However, water may be expensive depending on a site of installing the oxyfuel combustor, so that there may be a problem of substantial increase in running cost. Moreover, in a region where water is hardly available, there is a problem that the effect of removing impurities in exhaust gas cannot be enhanced by employing an alkaline aqueous solution.

The disclosure was made in view of the above and provides an impurity removal system which can produce an alkaline aqueous solution with no supply of water from outside to supply the same to an exhaust gas entry side of a cooler.

Solution to Problems

The disclosure is directed to an impurity removal system having a plurality of impurity separators comprising a plurality of compressors for compressing exhaust gas from an oxyfuel combustor and mainly constituted by carbon dioxide stepwisely to a target pressure for liquefied or compressed transportation and coolers for cooling the exhaust gas from the respective compressors to discharge water condensed by the cooling as drain, an alkaline aqueous solution being supplied to an exhaust gas entry side of the cooler to discharge the impurities in the exhaust gas together with the drain, the system comprising a drain tank for receiving the drain from the cooler to store a predetermined amount of drain, an alkaline aqueous solution supply unit comprising an aqueous solution adjustment tank for receiving and storing part of the drain from the drain tank, a solid alkaline agent supplier for supplying a solid alkaline agent to the drain in the aqueous solution adjustment tank to produce an alkaline aqueous solution, an alkaline concentration controller for controlling the solid alkaline agent supplier to regulate a detected alkaline concentration of the alkaline aqueous solution and a pump for supplying the alkaline aqueous solution in the aqueous solution adjustment tank to the exhaust gas entry side of the cooler, and an alkaline supply control unit comprising an impurity sensor arranged downstream of the cooler in a succeeding one of the impurity separators, a drain pH sensor for obtaining a detected pH of the drain in the drain tank, and a supply controller to which a detected impurity value from the impurity sensor and a detected pH from the drain pH sensor are inputted, the supply controller for regulating the alkaline aqueous solution supply unit on the basis of a detected impurity value by the impurity sensor so as to keep a detected pH by the drain pH sensor to a set value, thereby controlling an alkaline supply amount to the exhaust gas entry side of the cooler.

In the impurity removal system, the alkaline aqueous solution supply unit may comprise the aqueous solution adjustment tank for receiving through an intake valve and storing part of the drain from the drain tank, the solid alkaline agent supplier for supplying the solid alkaline agent through a regulator to the aqueous solution adjustment tank to produce the alkaline aqueous solution, a level gauge to measure a liquid level of the alkaline aqueous solution in the aqueous solution adjustment tank, an alkaline concentration sensor for obtaining a detected alkaline concentration of the alkaline aqueous solution in the aqueous solution adjustment tank, the alkaline concentration controller to which a detected level by the level gauge and the detected alkali concentration by the alkali concentration sensor are inputted, the alkaline concentration controller for controlling the intake valve so as to keep constant the level of the alkaline aqueous solution in the aqueous solution adjustment tank and for controlling the solid alkaline agent supplier so as to keep to any value the detected alkaline concentration of the alkaline aqueous solution in the aqueous solution adjustment tank, and the pump for supplying the alkaline aqueous solution in the aqueous solution adjustment tank to the exhaust gas entry side of the cooler.

In the impurity removal system, the alkaline supply control unit may control the alkaline concentration controller to regulate the solid alkaline agent supplier so as to produce the alkaline aqueous solution with constant detected alkaline concentration in the aqueous solution adjustment tank, and control the pump so as to obtain a supply amount of alkaline aqueous solution in accordance with the detected impurity value by the impurity sensor.

In the impurity removal system, the alkaline supply control unit may regulate the pump so as to keep constant the supply amount of the alkaline aqueous solution, and control the alkaline concentration controller to regulate the solid alkaline agent supplier so as to obtain the detected alkaline concentration of the alkaline aqueous solution in the aqueous solution adjustment tank in accordance with the detected impurity value by the impurity sensor.

In the impurity removal system, it is preferable that at least drain from the cooler in a first one of the impurity separators is guided to the drain tank.

In the impurity removal system, the alkaline aqueous solution in the aqueous solution adjustment tank may be supplied through the pump to the exhaust gas entry side of the cooler in a preceding one of the impurity separators.

In the impurity removal system, the alkaline aqueous solution in the aqueous solution adjustment tank may be supplied through a different pump to an exhaust gas entry side of the cooler in a succeeding one of the impurity separators.

In the impurity removal system, the alkaline supply control unit may control the alkaline concentration controller to regulate the solid alkaline agent supplier so as to produce the alkaline aqueous solution with constant detected alkaline concentration in the aqueous solution adjustment tank, and regulate the pump to control the supply amount of the alkaline aqueous solution in accordance with the detected impurity value by the impurity sensor, thereby controlling the alkaline supply amount.

In the impurity removal system, the alkaline supply control unit may regulate the pump so as to keep constant the supply amount of the alkaline aqueous solution, and control the alkaline concentration controller to regulate the solid alkaline agent supplier so as to obtain the detected alkaline concentration of the alkaline aqueous solution in the aqueous solution adjustment tank in accordance with the detected impurity value by the impurity sensor, thereby controlling the alkaline supply amount.

Advantageous Effects

According to an impurity removal system of the disclosure, drain taken out from a cooler downstream of a compressor is used to produce an alkaline aqueous solution, so that the alkaline aqueous solution can be produced and supplied with no supply of water from outside. Thus, obtainable is an excellent effect that an alkaline aqueous solution may be used to effectively remove impurities in exhaust gas from an oxyfuel combustor even in a region where water is expensive or hardly available.

BRIEF DESCRIPTION OF DRAWINGS

FIG. 2b is a diagram showing simulated relationship between alkaline supply amount and desulfurization ratio in respective Cases in FIG. 2a.

DESCRIPTION OF EMBODIMENTS

Embodiments of the disclosure will be described in conjunction with the attached drawings.

Figure 1:
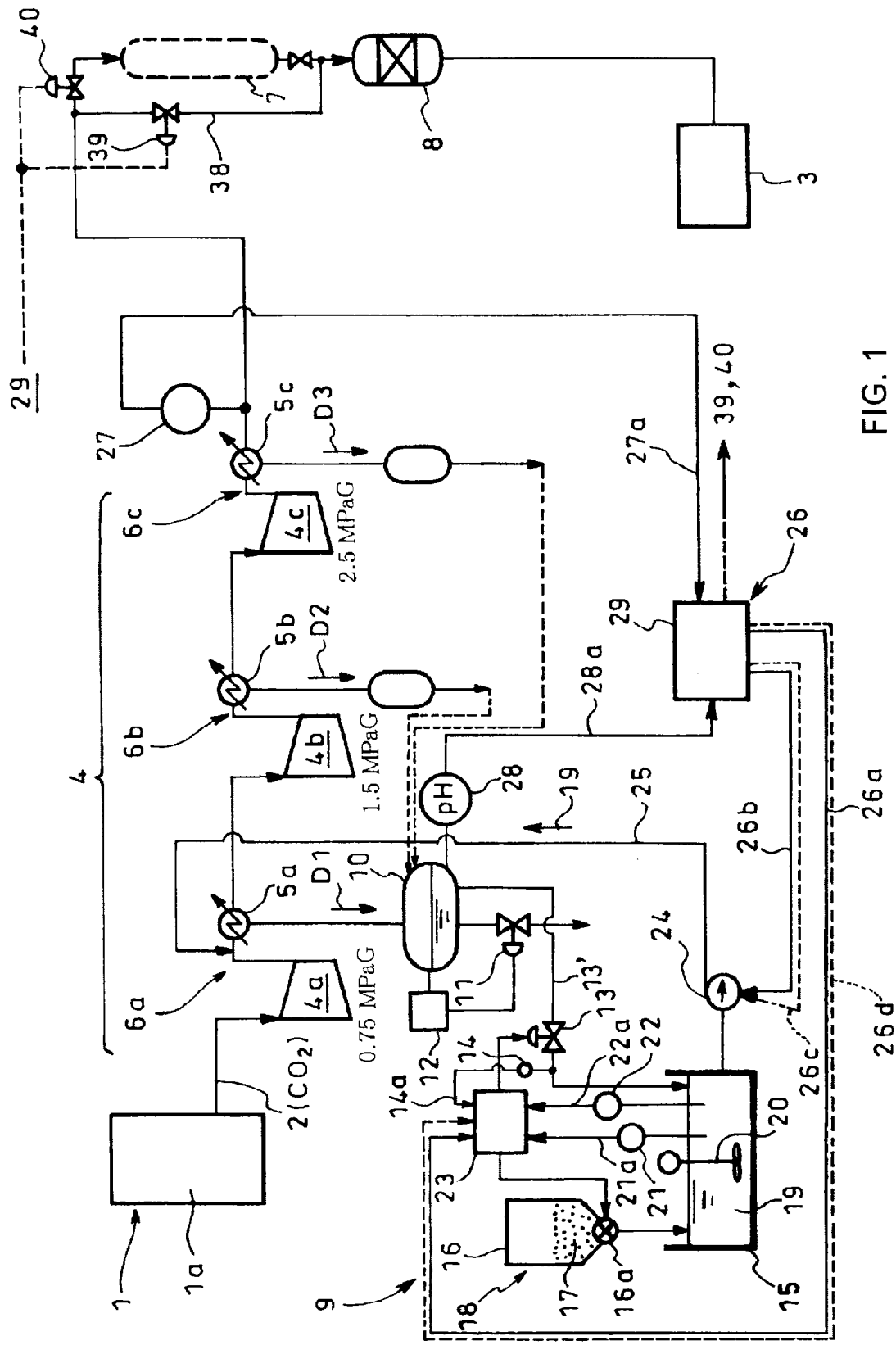
FIG. 1 is a systematic diagram showing an embodiment of an impurity removal system according to the disclosure provided for an oxyfuel combustor.

FIG. 1 is a systematic diagram showing an embodiment of an impurity removal system according to the disclosure provided for an oxyfuel combustor in which reference numeral 1 denotes an oxyfuel combustor such as a coal-fired boiler 1a for oxyfuel combustion of pulverized coal, exhaust gas 2 mainly constituted of carbon dioxide ($CO_2$) being discharged from the oxyfuel combustor 1. For supply of the exhaust gas 2 mainly constituted of carbon dioxide from the oxyfuel combustor 1 to a liquefier 3 for liquefaction thereof, arranged downstream of the oxyfuel combustor 1 is a compression unit 4 for compression of the exhaust gas 2 to a predetermined target pressure, thereby providing an impurity removal system for removal of impurities in the exhaust gas 2.

The compression unit 4 in FIG. 1 comprises a plurality of (three in the embodiment illustrated) impurity separators 6a, 6b and 6c arranged downstream of the oxyfuel combustor 1 and comprising a plurality of compressors 4a, 4b and 4c for compression of the exhaust gas 2 stepwisely up to the target pressure and coolers 5a, 5b and 5c for cooling of the exhaust gas 2 compressed in the respective compressors 4a, 4b and 4c to discharge water condensed as drains D1, D2 and D3. A cooler arranged between compressors is generally called as intercooler; however, in the disclosure, for ease of explanation, coolers 5a, 5b and 5c are referred to in the description.

Operations of the impurity separators 6a, 6b and 6c for liquefaction of carbon dioxide under various temperature and pressure conditions were studied to find out that a summed operational energy of the compressors 4a, 4b and 4c and carbon dioxide liquefier 3 is lowest when carbon dioxide is increased in pressure up to 2.5 MPa and temperature is lowered to −30° C. prior to the supply of the carbon dioxide to the liquefier 3. Thus, 2.5 MPa is set as the target pressure. Here, the target pressure of 2.5 MPa is a rough standard since temperature and pressure set to the impurity separators 6a, 6b and 6c may vary depending on components and water content of the exhaust gas 2 and carrying means (carrying vessel or the like). Cooling below −40° C., at which unusable is an alternative chlorofluorocarbon coolant in general, requires an ammonia refrigerator, disadvantageously resulting in increase in installation cost; it is thus preferable that the cooling temperature by the cooler 5 is set to −30° C. or so.

It is not efficient to pressurize the exhaust gas 2 up to the target pressure of 2.5 MPa all at once by a single compressor. Thus, in the embodiment, the three compressors 4a, 4b and 4c are arranged for three-step compressions into, say, 0.75 MPa, 1.5 MPa and 2.5 MPa and thus provide the impurity separators 6a, 6b and 6c. The number of the compressors 4a, 4b and 4c (the number of the impurity separators 6a, 6b and 6c) may be any including 4 or more.

With the pressures set as mentioned in the above, almost all of the water in the exhaust gas 2 is discharged as drain D1 in the first impurity separator 6a; a small amount of drain D2 is discharged in the middle impurity separator 6b; and a smaller amount of drain D3 is discharged in the last impurity separator 6c.

Part of impurities in the exhaust gas 2 is removed together with the drains D1, D2 and D3 during cooling by the impurity separators 6a, 6b and 6c. When a concentration of mercury (Hg) in the carbon dioxide having passed through the impurity separators 6a, 6b and 6c is higher than its target value, a mercury removal column 7 is arranged downstream of the compression unit 4 to remove mercury, using an adsorbent or the like (the mercury removal column 7 is shown in broken lines in the drawings). The mercury removal column 7 may be provided with a bypass duct 38 and changeover valves 39 and 40; flows of the exhaust gas passing and not passing through the mercury removal column 7 may be automatically changed over by changing over the changeover valves 39 and 40 by a command from a supply controller 29 to be referred to hereinafter. Arranged on an entry side of the carbon dioxide liquefier 3 is a dryer 8 for removal of water in the carbon dioxide to be supplied to the carbon dioxide liquefier 3.

In FIG. 1, reference numeral 10 denotes a drain tank which receives and stores drain D1 from the cooler 5a in the first impurity separator 6a. The drain tank 10 is provided with a discharge pipe having a discharge valve 11 and with a level controller 12 which detects a liquid level of the drain D1 in the drain tank 10 to control an opening degree of the discharge valve 11 so as to keep the liquid level always to a predetermined value.

In FIG. 1, reference numeral 9 denotes an alkaline aqueous solution supply unit. The alkaline aqueous solution supply unit 9 has an aqueous solution adjustment tank 15 which receives and stores part of the drain D1 in the drain tank 10 through an intake pipe 13' with an intake valve 13. The aqueous solution adjustment tank 15 is provided with a solid alkaline agent supplier 18 which serves to supply a solid alkaline agent 17 in a storage tank 16 in a regulated manner by a regulator 16a. Preferably, the storage tank 16 is airtightly constructed or has a moisture absorbent so as to prevent the solid alkaline agent 17 from absorbing moisture. The aqueous solution adjustment tank 15 is further provided with an agitator 20 which agitates the drain D1 and solid alkaline agent 17 to produce an alkaline aqueous solution 19.

The solid alkaline agent 17 usable is sodium hydroxide (NaOH), magnesium hydroxide or the like which is highly dispersible and causes no fixation or the like. Alternatively, limestone ($CaCO_3$), calcined lime (CaO), hydrated lime ($Ca(OH)_2$) or the like may be used when dispersibility can be maintained and a problem of fixation or the like can be solved.

The intake pipe 13' for intake of the drain D1 in the drain tank 10 into the aqueous solution adjustment tank 15 is provided with a flowmeter 14, and the aqueous solution adjustment tank 15 is provided with a level gauge 21 for measurement of a liquid level of an alkaline aqueous solution 19 in the aqueous solution adjustment tank 15 as well as an alkaline concentration sensor 22 for obtaining a detected alkaline concentration of the alkaline aqueous solution 19. A detected flow rate 14a by the flowmeter 14, a detected level 21a by the level gauge 21 and a detected alkaline concentration 22a by the alkaline concentration sensor 22 are inputted to an alkaline concentration controller 23. The alkaline concentration controller 23 is adapted to control the intake valve 13 so as to keep constant a detected level 21a of the alkaline aqueous solution 19 in the aqueous solution adjustment tank 15 and to control the regulator 16a in the alkaline aqueous solution supply unit 9 depending on the detected flow rate 14a by the flowmeter 14 so as to keep the alkaline concentration of the alkaline aqueous solution 19 in the aqueous solution adjustment tank 15 constant or to any value.

Further, a supply pipe 25 with a pump 24 is provided to extract the alkaline aqueous solution 19 from the aqueous solution adjustment tank 15 to an exhaust gas entry side of the cooler 5a in the first impurity separator 6a. Preferably, the alkaline aqueous solution 19 supplied to the exhaust gas entry side of the cooler 5a is through spraying of the alkaline aqueous solution 19 into the exhaust gas 2 by provision of, for example, nozzles.

The position where the alkaline aqueous solution 19 is supplied to exhaust gas 2 by the supply pipe 25 may be the exhaust gas entry side adjacent to the cooler 5a or any position between the cooler 5a and the compressor 4a upstream thereof.

In FIG. 1, reference numeral 26 denotes an alkaline supply control unit to control the supply of the alkaline aqueous solution 19 produced by the alkaline aqueous solution supply unit 9 to the exhaust gas entry side of the cooler 5a. The alkaline supply control unit 26 is provided with an impurity sensor 27 arranged downstream of the cooler 5c in the last impurity separator 6c to detect impurities (for example, sulfur oxides, hydrogen chloride and nitrogen oxides) in the exhaust gas 2, a drain pH sensor 28 to obtain a pH of the drain D1 in the drain tank 10, and the supply controller 29 to which a detected impurity value 27a by the impurity sensor 27 and a detected pH 28a by the drain pH sensor 28 are inputted. The impurity sensor 27 comprises at least a sensor for detection of sulfur oxides, a sensor for detection of hydrogen chloride and a sensor for detection of nitrogen oxides and may further comprise a sensor for detection of mercury.

Preferably, the impurity sensor 27 is arranged at an exit side of the last cooler 5c for confirmation of impurity removal effect by the disclosure. Alternatively, it may be arranged at any position downstream of the cooler 5c and between the cooler 5c and the drier 8 (or the mercury removal column 7).

The supply controller 29 serves to control the alkaline aqueous solution supply unit 9 on the basis of the detected impurity value 27a by the impurity sensor 27 to keep the detected pH 28a by the drain pH sensor 28 to a set value to thereby control an alkaline supply amount (a supply amount as an alkaline agent) supplied to the exhaust gas entry side of the cooler 5a. Moreover, when the detected mercury amount by the impurity sensor 27 becomes greater than its set value, the supply controller 29 changes over the change-over valves 39 and 40 to pass the exhaust gas 2 to the mercury removal column 7 in FIG. 1.

The alkaline supply control unit 26 can control the alkaline supply amount (the substantial supply amount as alkaline agent) in the following two alternative ways.

In the first way, the alkaline supply control unit 26 firstly controls the alkaline concentration controller 23, using a signal 26a, to regulate the solid alkaline agent supplier 18 so as to produce the alkaline aqueous solution 19 with the constant detected alkaline concentration 22a in the aqueous solution adjustment tank 15; in this state, the control unit 26 controls the pump 24, using a signal 26b, to control the supply amount of the alkaline aqueous solution 19 so as to supply the alkaline aqueous solution 19 in accordance with the detected impurity value 27a by the impurity sensor 27 to the exhaust gas entry side of the cooler 5a.

In the second way, the alkaline supply control unit 26 firstly regulates the pump 24, using a signal 26c, so as to keep constant the supply amount of the alkaline aqueous solution 19 to the exhaust gas entry side of the cooler 5a; in this state, the control unit 26 controls the alkaline concentration controller 23, using a signal 26d, to regulate a supply of the solid alkaline agent 17 by the solid alkaline agent supplier 18 to control the concentration of the alkaline aqueous solution 19 so as to make the detected alkaline concentration 22a of the alkaline aqueous solution 19 in the aqueous solution adjustment tank 15 correspond to the detected impurity value 27a by the impurity sensor 27.

According to the above-mentioned first or second way, the alkaline supply amount required for keeping the detected pH 28a in the drain tank 10 by the drain pH sensor 28 to a predetermined set value can be supplied to the exhaust gas entry side of the cooler 5a when the detected impurity value 27a by the impurity sensor 27 varies.

The drain D1 other than part thereof from the drain tank 10 into the aqueous solution adjustment tank 15 is discharged by a discharge valve 11 as surplus. The surplus drain D1 and drains D2 and D3 from the downstream impurity separators 6b and 6c are adjusted to pH 6-8, using an alkaline agent, so as not to cause any environmental influences, and are returned to the natural world.

Described in FIG. 1 embodiment is a case where the drain D1 from the cooler 5a in the first impurity separator 6a is stored in the drain tank 10 and is partly supplied to the aqueous solution adjustment tank 15. The drain D2 and/or D3 taken out more or less from the preceding cooler 5b and/or the succeeding cooler 5c may be supplied to the drain tank 10 as shown by broken lines.

Disclosed with reference to FIG. 1 embodiment is a case where the alkaline aqueous solution 19 in the aqueous solution adjustment tank 15 is supplied to the exhaust gas entry side of the cooler 5a in the first impurity separator 6a.

When the alkaline aqueous solution 19 in the aqueous solution adjustment tank 15 is quantitatively spare, the alkaline aqueous solution 19 may be also supplied to an exhaust gas entry side of the cooler 5b in the preceding or second impurity separator 6b.

Next, mode of operation of the above embodiment will be described.

The exhaust gas 2 mainly constituted of carbon dioxide and produced through oxyfuel combustion in the oxyfuel combustor 1 has a pressure of the order of, for example, 0.1 MPaG (1 atmosphere) and is guided to the compressor 4a in the first impurity separator 6a and is compressed by the compressor 4a to 0.7 MPaG. To the exhaust gas 2 compressed by the compressor 4a, the alkaline aqueous solution 19 from the alkaline aqueous solution supply unit 9 is mixed through spraying, and the mixed fluid of the exhaust gas 2 with the alkaline aqueous solution 19 is supplied to and cooled by the cooler 5a downstream of the compressor 4a, and a large volume of drain D1 is taken out from the first cooler 5a and is supplied to the drain tank 10.

As disclosed in the above, the compression of the exhaust gas 2 by the compressor 4a facilitates oxidation of the impurities in the exhaust gas; the oxidized impurities tend to be dissolved in the drain D1 resulting from the cooling through the cooler 5a downstream. Further, the supply of the alkaline aqueous solution 19 to the exhaust gas entry side of the cooler 5a enhances pH of water in the supply section, so that especially water-soluble impurities in the exhaust gas 2, i.e., sulfur oxides and hydrogen chloride are absorbed by the alkaline aqueous solution 19 and are effectively removed together with the drain D1. Here, the oxidization is facilitated with compression by the compressor 4a, so that pH of water in the exhaust gas 2 is as low as, for example, 2 or less. Thus, by spraying the alkaline aqueous solution 19, pH of water in the mixed atmosphere of the exhaust gas 2 with the alkaline aqueous solution 19 is kept high, which controls the supply (alkaline supply amount) of the alkaline aqueous solution 19 so as to keep the detected pH 28a of the drain D1 in drain tank 10 to a set value of, for example, pH 4-6.

The control of the alkaline supply amount is conducted by the alkaline supply control unit 26. In the first alternative, the alkaline supply control unit 26 firstly controls the alkaline concentration controller 23, using the signal 26a, to regulate the solid alkaline agent supplier 18 so as to produce the alkaline aqueous solution 19 with the constant detected alkaline concentration 22a in the aqueous solution adjustment tank 15; in this state, the control unit 26 controls the pump 24, using the signal 26b, so as to supply the alkaline aqueous solution 19 in accordance with the detected impurity value 27a by the impurity sensor 27 to the exhaust gas entry side of the cooler 5a. Specifically, when the detected impurity value 27a reveals increase of the impurities such as sulfur oxides and hydrogen chloride, the control is made to increase the supply amount of the alkaline aqueous solution 19.

In the second alternative, the alkaline supply control unit 26 firstly regulates the pump 24, using the signal 26c, so as to keep constant the supply amount of the alkaline aqueous solution 19 to the exhaust gas entry side of the cooler 5a; in this state, the control unit 26 controls the alkaline concentration controller 23, using the signal 26d, to regulate a supply of the solid alkaline agent 17 by the solid alkaline agent supplier 18 so as to make the detected alkaline concentration 22a of the alkaline aqueous solution 19 in the aqueous solution adjustment tank 15 correspond to the detected impurity value 27a by the impurity sensor 27. Specifically, when the detected impurity value 27a reveals increase of the impurities such as sulfur oxides and hydrogen chloride, the supply amount of the solid alkaline agent by the solid alkaline agent supplier 18 is increased to enhance the detected alkaline concentration 22a of the alkaline aqueous solution 19.

As disclosed in the above, in order to keep the detected pH 28a of the drain D1 in the drain tank 10 to a set value, the alkaline supply amount supplied to the exhaust gas entry side of the cooler 5a is controlled in accordance with the detected impurity value 27a of sulfur oxides and hydrogen chloride by the impurity sensor 27, so that the impurities mainly constituted of sulfur oxides and hydrogen chloride are removed stably and at high efficiency in the first impurity separator 6a.

According to the above-mentioned embodiment, by producing the alkaline aqueous solution 19 using the drain D1 taken out from the cooler 5a downstream of the compressor 4a, the alkaline aqueous solution 19 can be produced and supplied with no supply of water from outside at all.

The inventor conducted tests for comparison of impurity removal effect between an alkaline aqueous solution produced with drain utilized and that produced with water utilized.

Figure 2A:
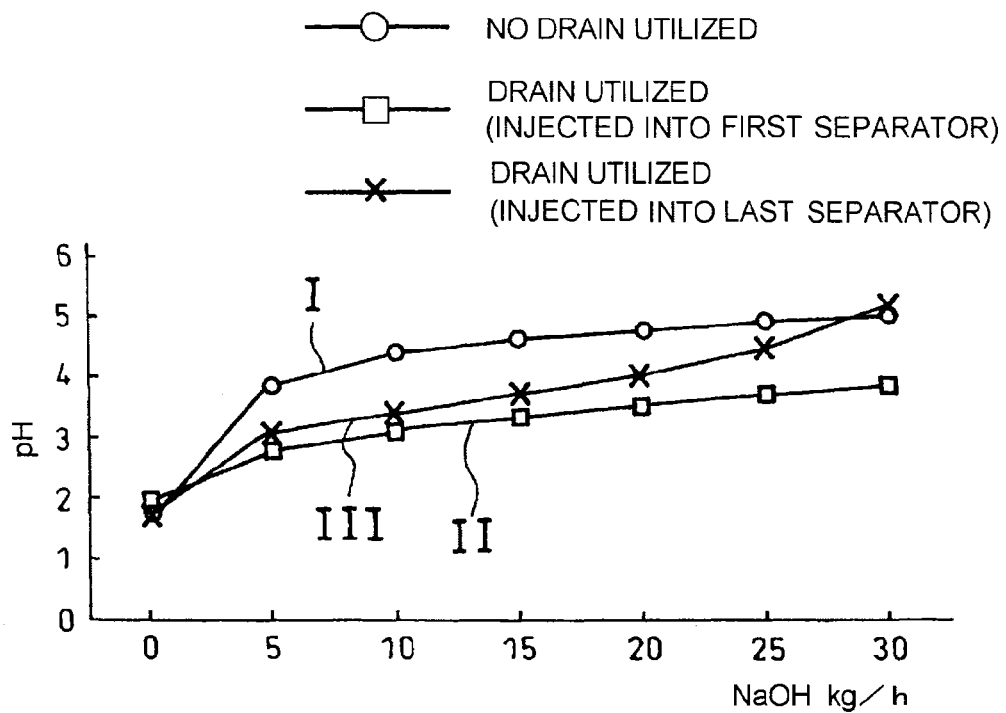
FIG. 2a is a diagram showing simulated results of relationship between alkaline supply amount and pH of discharged drain in Case I where water-employing alkaline aqueous solution (with no drain utilized) is supplied to the exhaust gas entry side of the first cooler, in Case II where drain-employing alkaline aqueous solution is supplied to the exhaust gas entry side of the first cooler and in Case III where drain-employing alkaline aqueous solution is supplied to the exhaust gas entry side of the last cooler.
Figure 2B:
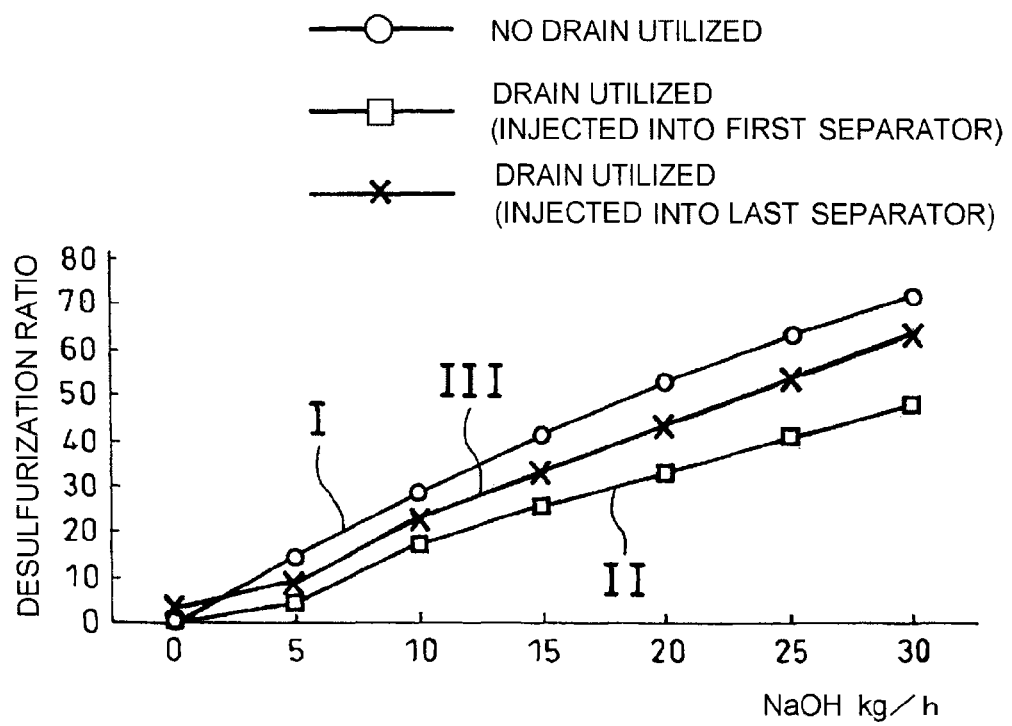

FIG. 2a is a diagram showing simulated results of relationship between alkaline supply amount and pH of discharged drain in Case I where water-employing alkaline aqueous solution (with no drain utilized) to the exhaust gas entry side of the first cooler 5a, in Case II where drain-employing alkaline aqueous solution is supplied the exhaust gas entry side of the first cooler 5a and in Case III where drain-employing alkaline aqueous solution is supplied to the exhaust gas entry side of the last cooler 5c. FIG. 2b is a diagram showing simulated results of relationship between alkaline supply amount and desulfurization ratio in the respective Cases in FIG. 2a

With respect to FIG. 2a, pH by supply of alkaline aqueous solution has higher value in water-employing Case I since water is inherently neutral (around pH 7); pH by supply of alkaline aqueous solution has lower value in drain-employing Case II of supplying alkaline aqueous solution to the exhaust gas entry side of the first cooler 5a since drain D1 is greater in amount; pH by supply of alkaline aqueous solution has value between those in Cases I and II in drain-employing Case III of supplying alkaline aqueous solution to the exhaust gas entry side of the last cooler 5c since drain D3 is less in amount.

In FIG. 2b, higher desulfurization ratio is obtained in water-employing Case I since pH is kept high; lower desulfurization ratio is obtained in drain-employing Case II of supplying alkaline aqueous solution to the exhaust gas entry side of the first cooler 5a since pH of drain D1 is lower; and desulfurization ratio is between those in Cases I and II in drain-employing Case III of supplying alkaline aqueous solution to the exhaust gas entry side of the last cooler 5c since pH is between those in Cases I and II.

As is clear from FIG. 2b, both in drain-employing and water-employing alkaline aqueous solutions, it is confirmed that supply of alkaline aqueous solution to keep pH of drain D1 high enhances impurity removal effect as pH increases. Thus, it becomes clear that drain-employing alkaline aqueous solution can be effectively utilized.

In the aqueous solution adjustment tank 15, a large amount of solid alkaline agent 17 is used to produce a large volume of alkaline aqueous solution 19. However, the drains D1, D2 and D3 are after all drained away and, upon the drainage, are required to be regulated into pH 6-8, using an alkaline agent, so as not to causes any environmental influences. Thus, despite different stages of the alkaline agent being used, a total amount of alkaline agent used is not different anyway.

The supply of the alkaline aqueous solution 19 to the exhaust gas entry side of the cooler 5a in the first impurity separator 6a removes corrosive components of and enhances pH of the exhaust gas 2, so that material corrosion can be lowered in the compressors 4b and 4c of the second and third impurity separators 6b and 6c where highness in compressive pressure accelerates oxidization.

As mentioned in the above, the carbon dioxide from which the impurities are removed by the impurities removal system may be made free from mercury by the mercury removal column 7 as needs demand, and is supplied to the drier 8 for removal of moisture, and then is supplied to the carbon dioxide liquefier 3 where it is liquefied by cooling. The resultant liquefied carbon dioxide is transported as liquid by a vessel or other transporting means to a destination where it is disposed. In the above-mentioned embodiment, the description is made on a case where compression is made by the compression unit 4 to the target pressure suitable for liquefaction of carbon dioxide by the carbon dioxide liquefier 3; however, the disclosure may be also applied to a case where the carbon dioxide compressed by the compression unit 4 to the target pressure is further compressed to a critical pressure by a high-pressure compression equipment and compressively transported through, for example, a pipeline to a destination where it is disposed.

In FIG. 1 embodiment, when the alkaline aqueous solution 19 in the aqueous solution adjustment tank 15 to be supplied to the first impurity separator 6a is quantitatively spare, the alkaline aqueous solution 19 is supplied to the first impurity separator 6a while part of the alkaline aqueous solution 19 in the aqueous solution adjustment tank 15 may be supplied to the exhaust gas entry side of the cooler 5c in the last impurity separator 6c.

Figure 3:
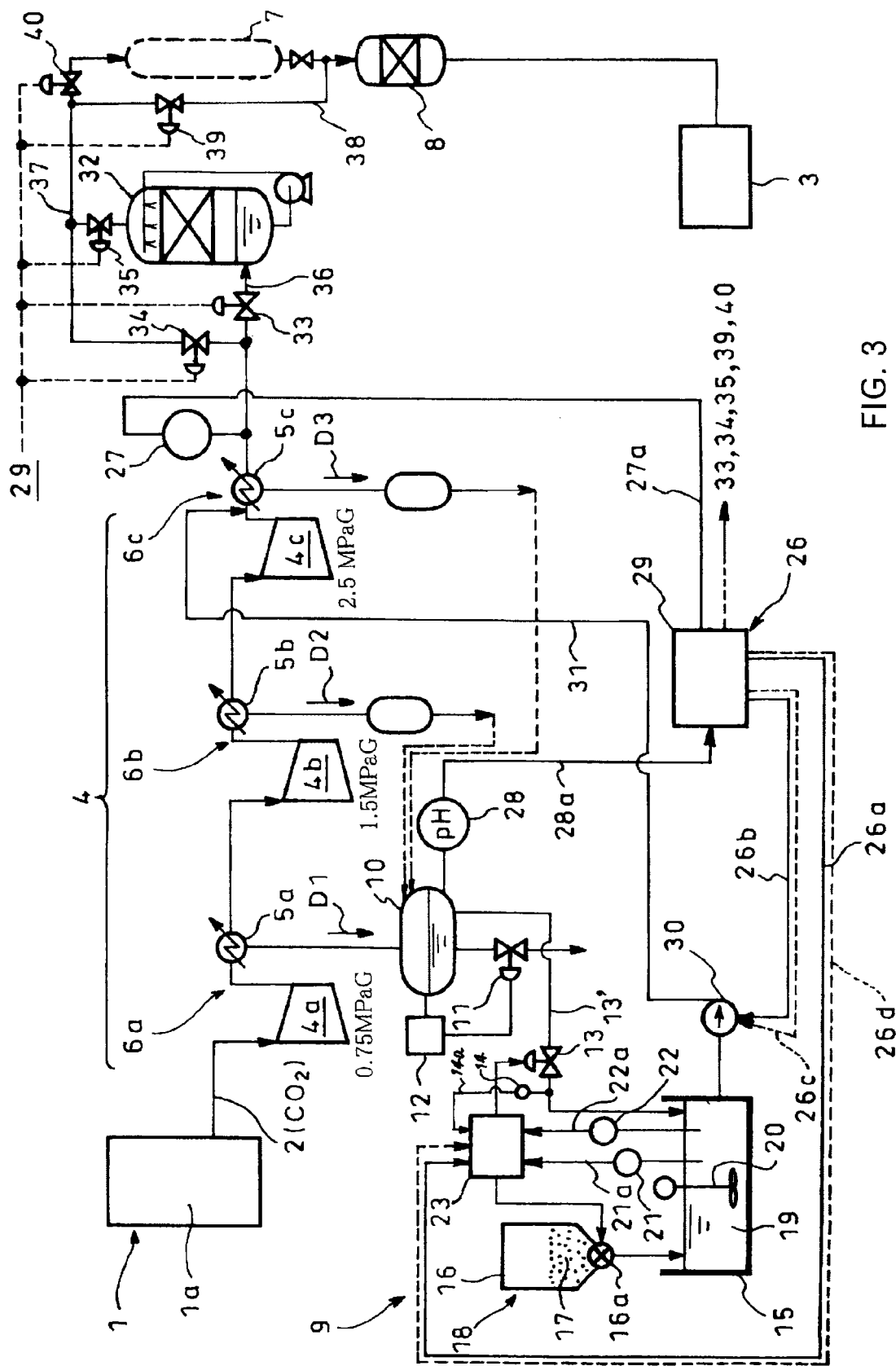
FIG. 3 is a systematic diagram showing a further embodiment of the impurity removal system in the disclosure.

FIG. 3 is a systematic view showing a further embodiment of an impurity removal system according to the disclosure. In this embodiment, the alkaline aqueous solution 19 in the aqueous solution adjustment tank 15 in the alkaline aqueous solution supply unit 9 is supplied by a pressurized different pump 30 through a supply pipe 31 to an exhaust gas entry side of the cooler 5c in the last impurity separator 6c. In the last impurity separator 6c, the exhaust gas 2 is pressurized by the last compressor 4c into 2.5 MPaG, which requires the pressurized supply by the different pump 30 to overcome the pressure.

When the alkaline aqueous solution 19 is supplied to the exhaust gas entry side of the cooler 5c in the last impurity separator 6c as shown in FIG. 3, the nitrogen oxides oxidized by the compression can be discharged together with the drain D3 in the last impurity separator 6c.

Simultaneously shown in FIG. 3 is provision of a wet desulfurization and denitration device at an exit side of the last impurity separator 6c. More specifically, arranged at the exit side of the impurity separator 6c is a desulfurization and denitration device 32 which is provided with changeover valves 33, 34 and 35 and with a supply duct 36 for supply of the exhaust gas to the desulfurization and denitration device 32 and a bypass duct 37 for flow of the exhaust gas 2 by bypass of the desulfurization and denitration device 32.

With the wet desulfurization and denitration device 32 being arranged at the exit side of the last impurity separator 6c as shown in FIG. 3, the exhaust gas 2 is guided to the desulfurization and denitration device 32 as needs demand, so that the impurities in the exhaust gas can be further lowered. In this case, a volume (flow rate) of the exhaust gas 2 guided out from the compressor 4c in the last impurity separator 6c is extremely trifle, so that the desulfurization and denitration device 32 used may be extremely small-sized (reduced in size to about one-several tenths in comparison with a conventional device) for removal of the impurities. The desulfurization and denitration device 32 shown in FIG. 3 may be also applied to the embodiment shown in FIG. 1.

In FIG. 3, the supply controller 29 changes over the changeover valves 33, 34 and 35 to guide the exhaust gas 2 to the desulfurization and denitration device 32 when at least one of the amount of sulfur oxides and that of nitrogen oxides detected by the impurity sensor 27 is greater than its set value. Further, the supply controller 29 changes over the changeover valves 39 and 40 to guide the exhaust gas 2 to the mercury removal column 7 when the amount of mercury detected by the impurity sensor 27 is greater than its set value.

As shown in FIGS. 1 and 3, according to the impurity removal system of the disclosure, the drain D1 discharged from the cooler 5a downstream of the compressor 4a is used to produce the alkaline aqueous solution 19 so that the alkaline aqueous solution 19 can be produced and supplied with no supply of water from outside at all. Thus, even in an region where water is expensive or hardly available, the alkaline aqueous solution 19 can be used to remove impurities in the exhaust gas 2 from the oxyfuel combustor 1 so that a range of regions where the oxyfuel combustor 1 is carried out can be expanded.

In the alkaline aqueous solution supply unit 9, part of the drain from the drain tank 10 is taken and stored in a constant amount in the aqueous solution adjustment tank 15; the solid alkaline agent supplier 18 is controlled by the alkaline concentration controller 23 to control the supply of the solid alkaline agent 17 to thereby control the detected alkaline concentration 22a in the alkaline aqueous solution 19 to any value; the alkaline aqueous solution 19 in the aqueous solution adjustment tank 15 is supplied by the pump 24 to the exhaust gas entry side of the cooler 5a, so that advantageously the alkaline aqueous solution 19 with any detected alkaline concentration value 22a can be supplied.

The alkaline supply control unit 26 can accurately supply a required alkaline supply amount by controlling the alkaline concentration controller 23 to regulate the solid alkaline agent supplier 18 so as to produce the alkaline aqueous solution 19 with constant detected alkaline concentration 22a in the aqueous solution adjustment tank 15 and by regulating the pump 24 to obtain the supply amount of the alkaline aqueous solution 19 in accordance with the detected impurity value 27a by the impurity sensor 27.

Alternatively, the alkaline supply control unit 26 can accurately supply a required alkaline supply amount by controlling the pump 24 to keep constant the supply amount of the alkaline aqueous solution 19 and by controlling the alkaline concentration controller 23 to regulate the solid alkaline agent supplier 18 so as to obtain the detected alkaline concentration 22a of the alkaline aqueous solution 19 in the aqueous solution adjustment tank 15 in accordance with the detected impurity value 27a by the impurity sensor 27.

When at least the drain D1 of the cooler 5a in a preceding or first impurity separator 6a is guided to the drain tank 10, a drain amount of the cooler 5a in the first impurity separator 6a is great so that a sufficient drain D1 can be ensured to produce the alkaline aqueous solution 19.

As shown in FIG. 1, when the alkaline aqueous solution 19 in the aqueous solution adjustment tank 15 is supplied through the pump 24 to an exhaust gas entry side of a preceding cooler, e.g., the cooler 5a in the first impurity separator 6a, especially sulfur oxides and hydrogen chloride in the exhaust gas can be effectively removed.

As shown in FIG. 3, when the alkaline aqueous solution 19 in the aqueous solution adjustment tank 15 is supplied through the different pump 30 to an exhaust gas entry side of a succeeding cooler, e.g., the cooler 5c in the last impurity separator 6c, especially nitrogen oxides in the exhaust gas can be effectively removed.

By the alkali supply control unit 26, the alkali concentration controller 23 is firstly controlled to regulate the solid alkali agent supplier 18 so as to produce the alkaline aqueous solution 19 with constant detected alkali concentration 22a in the aqueous solution adjustment tank 15; in this state, the pump 24 is regulated so as to supply the alkaline aqueous solution 19 in accordance with the detected impurity value 27a by the impurity sensor 27 to the exhaust gas entry side of the cooler 5a, so that the alkaline supply amount can be controlled by the supply amount of the alkaline aqueous solution 19.

Alternatively, by the alkali supply control unit 26, the pump 24 is firstly regulated so as to keep constant the supply amount of the alkaline aqueous solution 19 to the exhaust gas entry side of the cooler 5a; in this state, the alkali concentration controller 23 is controlled to regulate the supply of the solid alkali agent 17 by the solid alkali agent supplier 18 so as to obtain the detected alkaline concentration 22a of the alkaline aqueous solution 19 in the aqueous solution adjustment tank 15 in accordance with the detected impurity value 27a by the impurity sensor 27, so that the alkaline supply amount can be controlled by changing the detected alkali concentration 22a of the alkaline aqueous solution 19.

It is to be understood that an impurity removal system according to the disclosure is not limited to the above embodiments and that various changes and modifications may be made without departing from the scope of the disclosure.

REFERENCE SIGNS LIST 1 oxyfuel combustor
2 exhaust gas
3 carbon dioxide liquefier
4 compression unit
4a,4b,4c compressor
5a,5b,5c cooler
6a,6b,6c impurity separator
7 mercury removal column
8 drier
9 alkaline aqueous solution supply unit
10 drain tank
13 intake valve
15 aqueous solution adjustment tank
16a regulator
17 solid alkaline agent
18 solid alkaline agent supplier
19 alkaline aqueous solution
21 level gauge
21a detected level
22 alkali concentration sensor
22a detected alkali concentration
23 alkali concentration controller
24 pump
26 alkaline supply control unit
27 impurity sensor 27a detected impurity value
28 drain pH sensor
28a detected pH
29 supply controller
30 different pump
D1, D2, D3 drain

The invention claimed is:

1. An impurity removal system having a plurality of impurity separators comprising a plurality of compressors configured to stepwisely compress an oxyfuel combustor exhaust gas mainly constituted of carbon dioxide to a target pressure for liquefied or compressed transportation, and coolers each for cooling the exhaust gas from the corresponding compressor to discharge water condensed by the cooling as drain, an alkaline aqueous solution being supplied to an exhaust gas entry side of one of the coolers to discharge impurities in the exhaust gas together with the drain, the system comprising
a drain tank for receiving the drain from at least one of the coolers to store a predetermined amount of drain,
an alkaline aqueous solution supply unit comprising an aqueous solution adjustment tank for receiving and storing part of the drain from the drain tank, a solid alkaline agent supplier for supplying a solid alkaline agent to the drain in the aqueous solution adjustment tank to produce the alkaline aqueous solution, an alkaline concentration controller for controlling the solid alkaline agent supplier to regulate a detected alkaline concentration of the alkaline aqueous solution and a pump for supplying the alkaline aqueous solution in the aqueous solution adjustment tank to the exhaust gas entry side of the cooler, and
an alkaline supply control unit comprising an impurity sensor arranged downstream of the cooler in a succeeding one of the impurity separators, a drain pH sensor for obtaining a detected pH of the drain in the drain tank, and a supply controller to which a detected impurity value from the impurity sensor and a detected pH from the drain pH sensor are inputted, the supply controller for regulating the alkaline aqueous solution supply unit on a basis of the detected impurity value by the impurity sensor so as to keep the detected pH by the drain pH sensor to a set value, thereby controlling an alkaline supply amount to the exhaust gas entry side of the cooler.

2. The impurity removal system as claimed in claim 1 wherein the alkaline aqueous solution supply unit comprises the aqueous solution adjustment tank for receiving through an intake valve and storing part of the drain from the drain tank, the solid alkaline agent supplier for supplying the solid alkaline agent through a regulator to the aqueous solution adjustment tank to produce the alkaline aqueous solution, a level gauge to measure a liquid level of the alkaline aqueous solution in the aqueous solution adjustment tank, an alkaline concentration sensor for obtaining a detected alkaline concentration of the alkaline aqueous solution in the aqueous solution adjustment tank, the alkaline concentration controller to which a detected level by the level gauge and the detected alkali concentration by the alkali concentration sensor are inputted, the alkaline concentration controller for controlling the intake valve so as to keep constant the level of the alkaline aqueous solution in the aqueous solution adjustment tank and for controlling the solid alkaline agent supplier so as to keep to a predetermined value the detected alkaline concentration of the alkaline aqueous solution in the aqueous solution adjustment tank, and the pump for supplying the alkaline aqueous solution in the aqueous solution adjustment tank to the exhaust gas entry side of the cooler.

3. The impurity removal system as claimed in claim 1 wherein the alkaline supply control unit controls the alkaline concentration controller to regulate the solid alkaline agent supplier so as to produce the alkaline aqueous solution with constant detected alkaline concentration in the aqueous solution adjustment tank, and controls the pump so as to obtain a supply amount of alkaline aqueous solution in accordance with the detected impurity value by the impurity sensor.

4. The impurity removal system as claimed in claim 2 wherein the alkaline supply control unit controls the alkaline concentration controller to regulate the solid alkaline agent supplier so as to produce the alkaline aqueous solution with constant detected alkaline concentration in the aqueous solution adjustment tank, and controls the pump so as to obtain a supply amount of alkaline aqueous solution in accordance with the detected impurity value by the impurity sensor.

5. The impurity removal system as claimed in claim 1 wherein the alkaline supply control unit regulates the pump so as to keep constant the supply amount of the alkaline aqueous solution, and controls the alkaline concentration controller to regulate the solid alkaline agent supplier so as to obtain the detected alkaline concentration of the alkaline aqueous solution in the aqueous solution adjustment tank in accordance with the detected impurity value by the impurity sensor.

6. The impurity removal system as claimed in claim 2 wherein the alkaline supply control unit regulates the pump so as to keep constant the supply amount of the alkaline aqueous solution, and controls the alkaline concentration controller to regulate the solid alkaline agent supplier so as to obtain the detected alkaline concentration of the alkaline aqueous solution in the aqueous solution adjustment tank in accordance with the detected impurity value by the impurity sensor.

7. The impurity removal system as claimed in claim 4 wherein at least one of the coolers is a first one of the coolers.

8. The impurity removal system as claimed in claim 6 wherein at least one of the coolers is a first one of the coolers.

9. The impurity removal system as claimed in claim 7 wherein alkaline aqueous solution in the aqueous solution adjustment tank is supplied through the pump to the exhaust gas entry side of the cooler in a preceding one of the impurity separators.

10. The impurity removal system as claimed in claim 8 wherein alkaline aqueous solution in the aqueous solution adjustment tank is supplied through the pump to the exhaust gas entry side of the cooler in a preceding one of the impurity separators.

11. The impurity removal system as claimed in claim 1 wherein alkaline aqueous solution in the aqueous solution adjustment tank is supplied through a different pump to an exhaust gas entry side of the cooler in a succeeding one of the impurity separators.

12. The impurity removal system as claimed in claim 2 wherein alkaline aqueous solution in the aqueous solution adjustment tank is supplied through a different pump to an exhaust gas entry side of the cooler in a succeeding one of the impurity separators.

13. The impurity removal system as claimed in claim 11 wherein the alkaline supply control unit controls the alkaline concentration controller to regulate the solid alkaline agent supplier so as to produce the alkaline aqueous solution with constant detected alkaline concentration in the aqueous solution adjustment tank, and regulates the pump to control the supply amount of the alkaline aqueous solution in accordance with the detected impurity value by the impurity sensor, thereby controlling the alkaline supply amount.

14. The impurity removal system as claimed in claim 12 wherein the alkaline supply control unit controls the alkaline concentration controller to regulate the solid alkaline agent supplier so as to produce the alkaline aqueous solution with constant detected alkaline concentration in the aqueous solution adjustment tank, and regulates the pump to control the supply amount of the alkaline aqueous solution in accordance with the detected impurity value by the impurity sensor, thereby controlling the alkaline supply amount.

15. The impurity removal system as claimed in claim 11 wherein the alkaline supply control unit regulates the pump so as to keep constant the supply amount of the alkaline aqueous solution, and controls the alkaline concentration controller to regulate the solid alkaline agent supplier so as to obtain the detected alkaline concentration of the alkaline aqueous solution in the aqueous solution adjustment tank in accordance with the detected impurity value by the impurity sensor, thereby controlling the alkaline supply amount.

16. The impurity removal system as claimed in claim 12 wherein the alkaline supply control unit regulates the pump so as to keep constant the supply amount of the alkaline aqueous solution, and controls the alkaline concentration controller to regulate the solid alkaline agent supplier so as to obtain the detected alkaline concentration of the alkaline aqueous solution in the aqueous solution adjustment tank in accordance with the detected impurity value by the impurity sensor, thereby controlling the alkaline supply amount.

* * * * *